Patented Oct. 5, 1937

2,095,188

UNITED STATES PATENT OFFICE 2,095,188

IRON AND STEEL CEMENTING BATH COMPOSITION

Hugo Hanusch, Berlin-Rauchfangswerder, Germany, assignor to Deutsche Houghton-Fabrik G. m. b. H., Magdeburg, Buckau, Germany No Drawing. Application November 15, 1935, Serial No. 50,057. In Germany March 12, 1934

4 Claims. (Cl. 148—30)

For the cementation of steel and iron fused salt baths have already been used which contain cyanide compounds as cementation and hardening agents, and it has also already been proposed to enrich known case hardening salt baths containing only a little cyanide or none at all, with carbon as cementation carrier. As suited for the purpose stated charcoal, leather charcoal, bone-charcoal, graphite, activated carbon and activated carbon of low combustibility have been recommended.

Concerning the addition of graphite to the usual salt baths it must be said that this substance cannot possibly be acknowledged as a cementation agent inasmuch as a transformation and a discharge of carburizing carbonaceous gases commences only at temperatures of over 1400° C. The salts and the steels to be cemented are, however, not able to stand such temperatures.

It has also been proposed to increase the cementation action of fused salt baths containing carbon by admixing to them a suitable oxygen carrier or suitable oxygen carriers, as, for instance, oxide of strontium.

The admixture of suitable cementation agents to the salt baths in the form of carbon is, however, connected with difficulties insofar as the baths are able to take up only a limited percentage of the generally highly voluminous carbon.

It has, however, now been discovered that a particularly favorable cementation action can be obtained if graphite oxide, for instance graphitic acid ($C_{11}O_4$), is used as cementation agent. Graphite oxide has the property to give off, when being decomposed, not only large amounts of gases having a great cementation capacity, but also to increase considerably the stability of the bath. When graphitic acid is decomposed, there arises at first graphite soot which attains about the 40-fold volume of the original acid. By a suitable composition of the salt-bath, especially by using oxygen-discharging agents as components, the decomposition of the graphite oxide can be regulated in any desired manner.

The necessary regeneration of the carbon required in the fused cementing salt bath during the operation can according to my invention be carried out without any trouble, as by a very small addition of graphitic acid a large enrichment with carbon and an intimate intermixing with the salt-bath components is obtained.

Example

A salt-bath prepared according to this invention may have, for instance, the following composition:

|  | Percent |
|---|---|
| Barium chloride | 68 |
| Sodium cyanide | 8 |
| Sodium chloride | 17 |
| Graphitic acid ($C_{11}O_4$) | 2 |
| Barium carbonate | 5 |

In order to regenerate the bath the following additions, preferably in the form of pressed blocks, are made from time to time:

|  | Percent |
|---|---|
| Barium chloride | 65 |
| Sodium chloride | 12 |
| Graphitic acid ($C_{11}O_4$) | 15 |
| Barium carbonate | 8 |

Sodium cyanide is separately added if required, to the regenerating bath.

I claim:

1. A fused salt bath for the cementation of iron and steel, containing cyanide, and containing graphitic oxide as an agent for increasing the cementation effect.

2. A fused salt bath for the cementation of iron and steel, containing cyanide, and containing graphitic acid as an agent for increasing the cementation effect.

3. A fused salt bath for the cementation of iron and steel, containing cyanide, and containing graphitic oxide, together with agents capable of accelerating the decomposition of the graphitic oxide to increase the cementation effect.

4. A fused salt bath for the cementation of iron and steel, containing cyanide, and containing graphitic oxide, together with a substance capable of releasing oxygen to increase the cementation effect.

HUGO HANUSCH.